United States Patent
Garcia Briz

(10) Patent No.: US 7,268,679 B2
(45) Date of Patent: Sep. 11, 2007

(54) REAR LIGHTING SYSTEM APPLIED TO AN AUTOMOTIVE VEHICLE

(75) Inventor: Alberto Garcia Briz, Valls (ES)

(73) Assignee: Lear Corporation, Southfield, MI (US)

( * ) Notice: Subject to any disclaimer, the term of this patent is extended or adjusted under 35 U.S.C. 154(b) by 265 days.

(21) Appl. No.: 10/711,439

(22) Filed: Sep. 18, 2004

(65) Prior Publication Data

US 2006/0061466 A1 Mar. 23, 2006

(51) Int. Cl.
*B60Q 1/26* (2006.01)
(52) U.S. Cl. .................. 340/469; 340/458; 340/479
(58) Field of Classification Search ............ 340/467, 340/468, 469, 471, 472, 475, 479, 458; 315/82, 315/88, 291; 362/61, 227, 228
See application file for complete search history.

(56) References Cited

U.S. PATENT DOCUMENTS

| | | | | |
|---|---|---|---|---|
| 5,089,805 A | * | 2/1992 | Salsman | 340/467 |
| 5,231,373 A | * | 7/1993 | Freeman et al. | 340/469 |
| 5,680,098 A | * | 10/1997 | Bejster et al. | 340/458 |
| 5,785,413 A | * | 7/1998 | Tillinghast et al. | 362/228 |
| 5,909,174 A | * | 6/1999 | Dietz et al. | 340/479 |
| 6,417,624 B1 | * | 7/2002 | Ito et al. | 315/88 |
| 6,828,739 B2 | * | 12/2004 | Bruwer et al. | 315/291 |
| 6,969,183 B2 | * | 11/2005 | Okubo et al. | 362/466 |
| 2002/0191416 A1 | | 12/2002 | Wesson | 362/555 |
| 2003/0206418 A1 | | 11/2003 | Strazzanti | 362/540 |
| 2003/0227257 A1 | | 12/2003 | Serizawa et al. | |

FOREIGN PATENT DOCUMENTS

| | | |
|---|---|---|
| BE | 1011788 A6 | 1/2000 |
| DE | 2732780 A1 | 2/1979 |

* cited by examiner

*Primary Examiner*—Van T. Trieu
(74) *Attorney, Agent, or Firm*—Bruce E Harang

(57) ABSTRACT

A rear lighting system for an automobile having the ability to serve several functions and to detect and compensate for burned out or damaged lighting elements.

22 Claims, 5 Drawing Sheets

REAR LIGHTING SYSTEM APPLIED TO AN AUTOMOTIVE VEHICLE

FIELD OF THE INVENTION

The present invention generally relates to a rear lighting system applied to an automotive vehicle, and more particularly to a rear lighting system capable of carrying out multiple functions and of compensating for a possible malfunctioning of any of the light sources included in the system.

DESCRIPTION OF THE RELATED ART

With the advancement of the manufacturing technology of Light-Emitting Diodes (LED), and the consequent reduction in price thereof, the standard light bulbs used in vehicle rear lighting systems have begun to be replaced by this class of devices. At the same time, the possibility of using the same light source or light sources to carry out different functions has been worked on, for example, according to the intensity to be made to circulate therethrough.

Several proposals focused on said replacement and introduction of LEDs and on using the advantages they offer regarding the variation of light intensity emitted according to the variation of electrical intensity to be made to circulate therethrough, have appeared in recent years. One of them is provided by patent application US2002/0191416, which proposes a module formed by LEDs adapted for being used instead of a bayonet type bulb. The module is formed by a plurality of LEDs assembled on a printed circuit associated to control means energizing the LEDs with two intensity levels: one for making them function in brake light mode and another one for making them function in rear light mode.

The intensity level regarding the brake light mode is claimed as higher than that provided in the rear light mode, and the necessity for a higher intensity level is not considered, such as that which a possible operating mode of anti-fog lights, for example, would require, which is not provided for in the application.

One proposal which does consider using the same light sources as brake lights and anti-fog lights, among other functions, is that disclosed in patent application US-A-2003/0206418, concerning a rear light assembly with one light source and an enclosure with a light transmissive portion. One portion of the enclosure includes a material, adhered to determined regions of the transmissive portion, which by being electrically energized varies its light transmission properties so that the assembly can develop different lighting functions, such as brake lights, parking lights, backup lights, anti-fog lights, etc.

Although it is claimed that the light source has two filaments for emitting with two intensity levels, the patent is focused on achieving said lighting functions as a result of the properties of said material. On the other hand, in said application, the possibility of using more than one light source is not considered.

In neither of the two mentioned background documents is the monitoring of the operation of the light sources proposed, something that Spanish patent ES-A-2107356 does propose, which relates to a sequencer and vehicle brake lamp failure detector device. The device comprises an electronic circuit including a series of steps, among which there is a sequencing step thanks to which the brake lights emit by means of flashing, and a detector step monitoring the brake lamps, analyzing electronic and/or optical parameters thereof, and an actuation step for actuating warning lamps of the vehicle in the event that a positive detection by said detector step occurs. The possibility of choosing an operating mode is provided, in which only the sequencer step acts, another one in which only the detector step acts (the lamps continuously emitting) and another one in which both steps act.

The patent is only applied to brake lights and does not propose the possibility of compensating for a possible malfunctioning thereof, but only actuating warning lights and other signaling elements when said malfunctioning is detected.

SUMMARY

It is interesting to make a proposal considering the use of a single lighting assembly, which by combining the light sources included therein and/or varying the intensity circulating therethrough, can carry out different lighting functions, such as those regarding brake lights, anti-fog lights, etc., and including, as in the last background document mentioned, detection means for detecting the malfunctioning of said light sources, but unlike said background document, said detection does not only serve for actuating a corresponding signaling device, but also for compensating for said malfunctioning by means of the increase of the intensity circulating through the light sources or by means of switching on other spare light sources, thus achieving the compensation of the light decrease which said malfunctioning may cause.

The present invention relates to a rear lighting system applied to an automotive vehicle, of the type comprising: at least one supporting element, such as a rigid or flexible printed circuit; a plurality of light sources, preferably LEDs, assembled on said supporting element, which is at least one in number; and a control means electrically connected to said light sources, to actuate them such that the light sources can emit with at least two light intensity levels in order to carry out at least two corresponding lighting functions, one of which consists of acting as brake lights and another one as anti-fog lights, although more than two light intensity levels are possible.

Said control means comprise detection means for detecting a malfunctioning of at least one of said light sources and are adapted to compensate for a corresponding variation in the total light intensity provided by the system due to said malfunctioning by means of actuating or deactivating at least another one, or other ones, of said light sources which remained switched off, and/or increasing or decreasing the current to be made to circulate through at least said other light source, another different one, or all those included in the system.

BRIEF DESCRIPTION OF THE DRAWINGS

Other features of the invention will become clearer from the following description of an embodiment example illustrated in the attached drawing and which should be taken as an illustrative and non-limiting example. In the drawing.

DETAILED DESCRIPTION OF THE INVENTION

Figure 1:
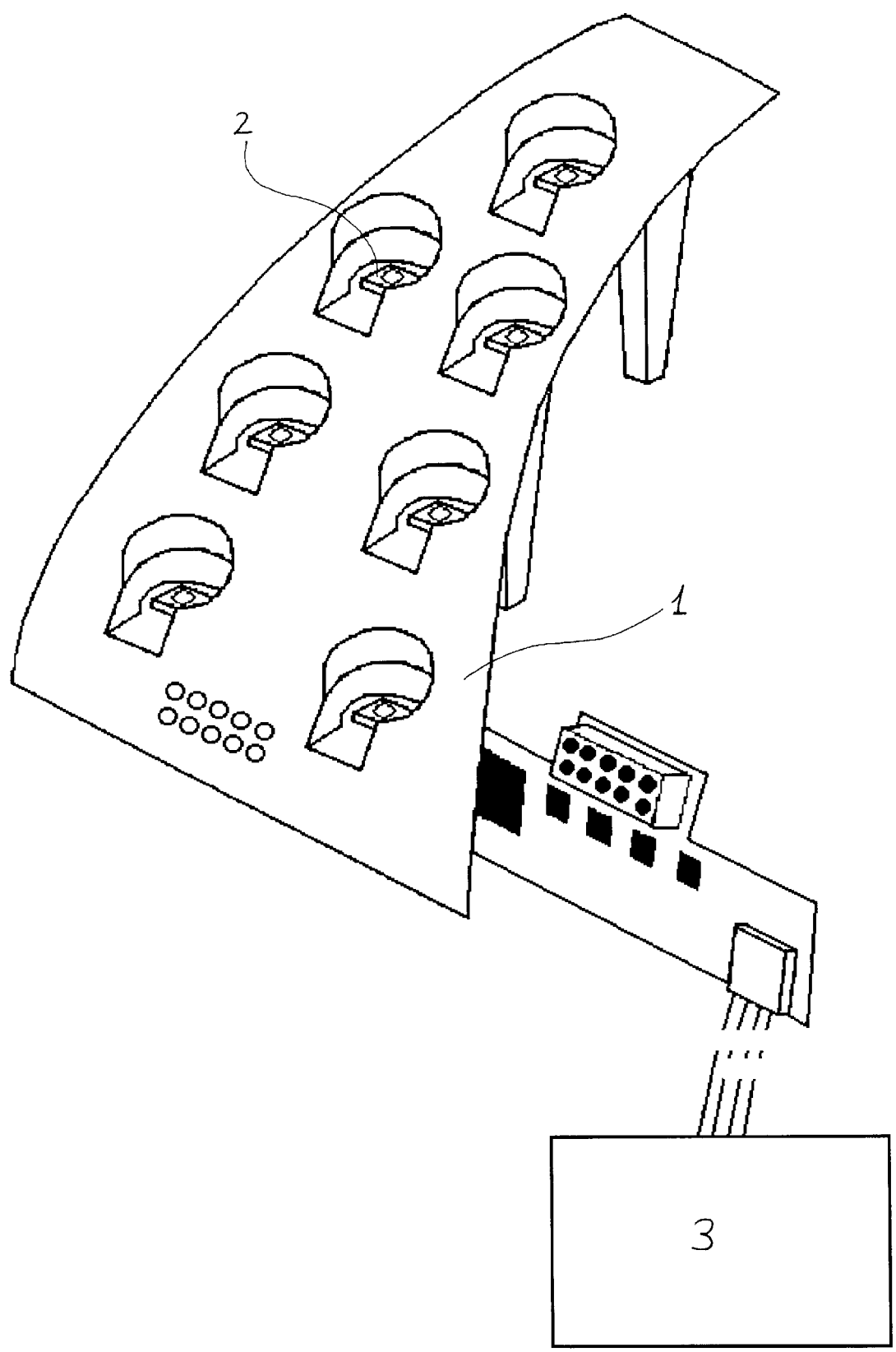
FIG. 1 shows in a partially schematic manner an embodiment example of the lighting system proposed by the present invention.

As shown in the attached figures, the present invention relates to a rear lighting system applied to an automotive vehicle, of the type comprising: a supporting element 1, preferably a rigid or flexible printed circuit; a plurality of light sources 2, preferably LEDs, assembled on said printed circuit and welded to electroconducting tracks thereof; and a control means 3 electrically connected to said light sources 2 to actuate them such that the light sources 2 can emit with different light intensity levels in order to carry out different corresponding lighting functions, such as those of acting as brake lights, anti-fog lights or sidelamps, although other functions are possible.

Said control means 3 comprise detection means for detecting a malfunctioning of at least one of said light sources 2, and are adapted to compensate for a corresponding variation in the total light intensity provided by the system due to said malfunctioning by means of actuating or deactivating at least another one of said light sources 2 and/or increasing or decreasing the current to be made to circulate through at least said other light source 2 or another different one.

For one embodiment example, the light sources 2 of said plurality of light sources 2 are divided into a first group, or main group, and a second group, or spare group, which light sources 2 are usually switched off but at least a part of which are actuated by the control means 3 to compensate for the malfunctioning of any of the light sources 2 of the first group, when necessary.

In another embodiment example, the light sources 2 of the plurality of light sources 2 are actuated all at the same time by said control means 3, and when a malfunctioning of one of them occurs, the control means 3 compensate for a corresponding variation in the total light intensity provided by the system due to said malfunctioning by means of increasing or decreasing the current to be made to circulate through all the light sources 2, or through some of them.

A combination of the two explained embodiment examples is possible, i.e. the malfunctioning of one or more light sources 2 is compensated for by means of switching on any light source 2 belonging to a spare group while at the same time increasing the intensity to be made to circulate through the light sources 2 switched on.

The combination in the system of light sources 2 emitting light of different colors is also possible, therewith achieving an increase in the number of lighting functions to be provided by the proposed rear lighting system.

The control means 3 comprises an electronic system, comprising at least one microprocessor 31, associated to said detection means 32, electronic system by means of which the control means 3 control the current to be made to circulate through the light sources 2, increasing it or decreasing it, depending on the case, preferably using Pulse Wave Modulation (PWM) 33 techniques.

The invention also proposes actuating the light sources 2 to emit with said light intensity level in order to carry out said function consisting of acting as brake lights, according to a corresponding detection of a sudden speed reduction of the vehicle not caused by the actuation of a brake pedal thereof, the control means 3 therefore being suitably adapted for that.

Figure 3:
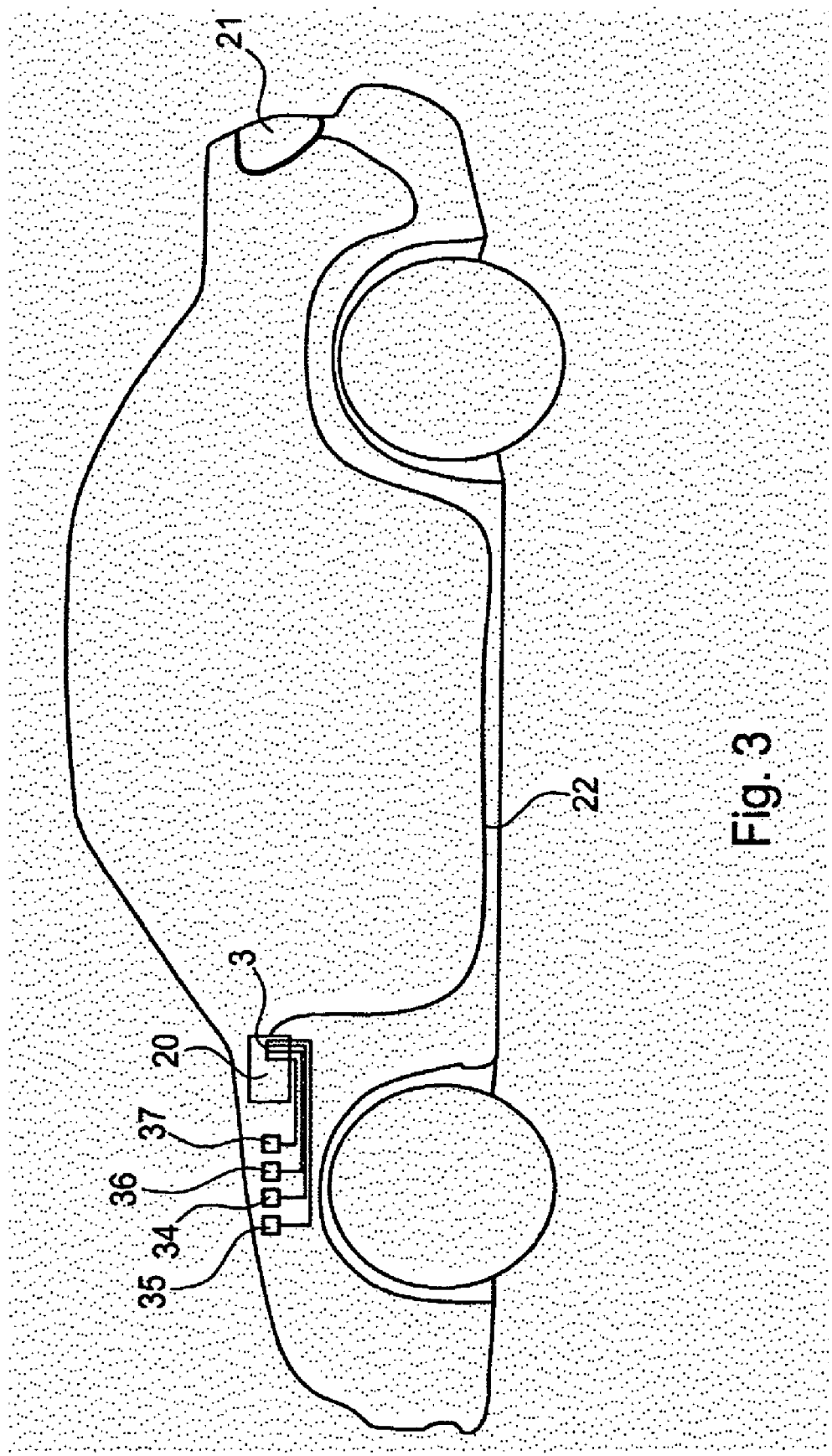
FIG. 3 shows one embodiment of the control means mounted on an automobile onboard computer and cooperatively connected to a lighting unit and various sensors.

To detect said sudden speed reduction of the vehicle, the system comprises a series of suitable detectors, such as an accelerometer 34 and/or inclinometer 35, or simply carries out a corresponding consultation with a computer 20 on board the vehicle through the control means 3, computer 20 which is aware of said sudden speed reduction by means of a series of associated devices known by a person skilled in the art. Such an embodiment is illustrated in FIG. 3 which also shows a tail light assembly 21 and associated wiring 22.

For another embodiment example, the control means 3 are adapted to actuate the light sources 2 to emit with said light intensity level in order to carry out said function consisting of acting as anti-fog lights, according to a corresponding detection of fog in the environment surrounding the vehicle, thus the system comprises one or several fog sensor devices, which in turn comprise a humidity sensor 37 and a temperature sensor 36.

For a preferred embodiment example, the proposed system is partially arranged inside a casing 51 closed with a cover 52, at least partially transparent, situated in the rear part of a vehicle, being part of the control means 3 arranged in another part of the vehicle different to that of said casing 51, and the electronic system preferably being part of a computer 20 on board said vehicle. Such case is possible with the embodiment example shown in FIGS. 1 and 3, in which the control means 3, schematically shown, are spaced from the rest of the system.

Figure 2:
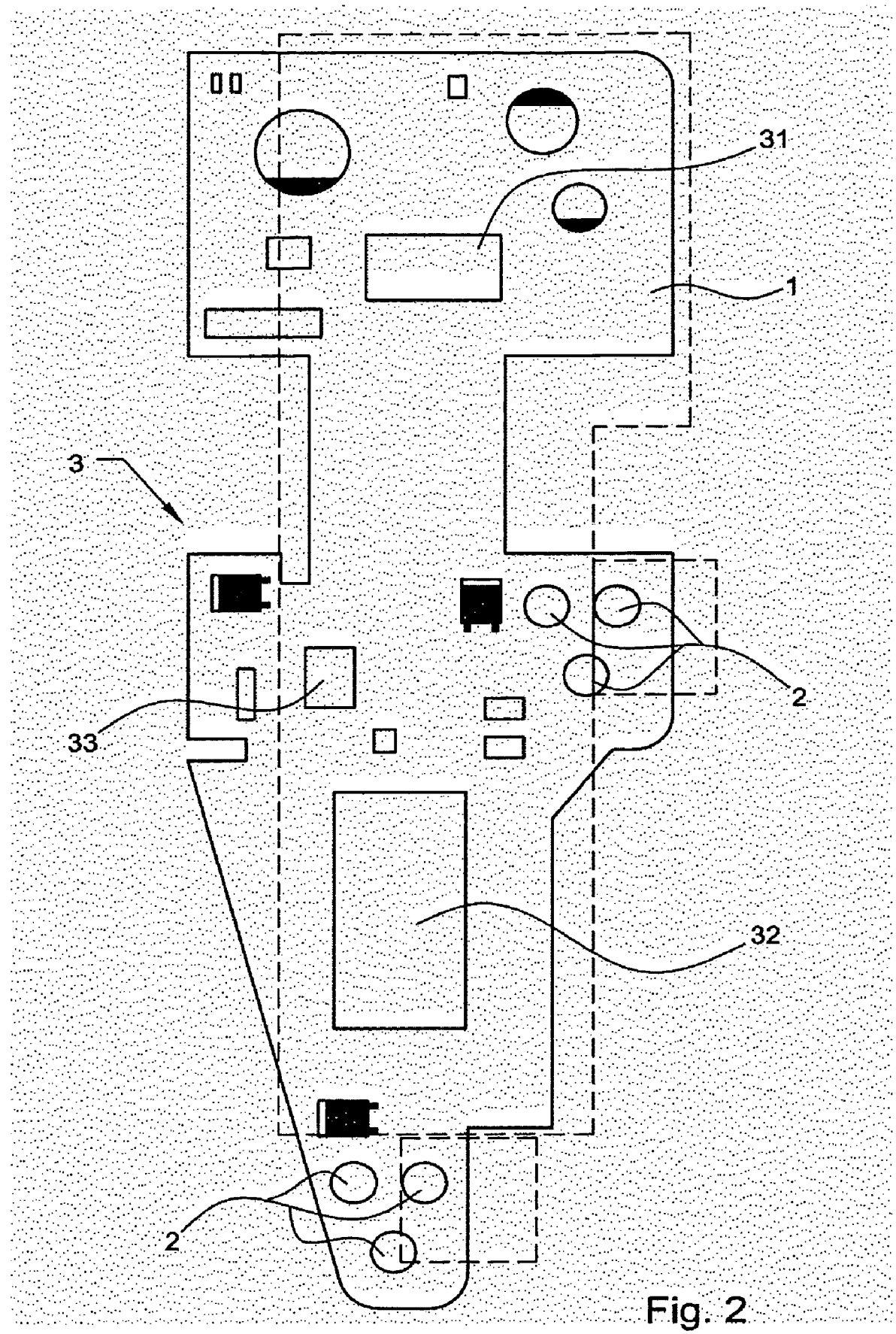
FIG. 2 shows another embodiment example of the system in which the light sources are divided into two groups.
Figure 5:
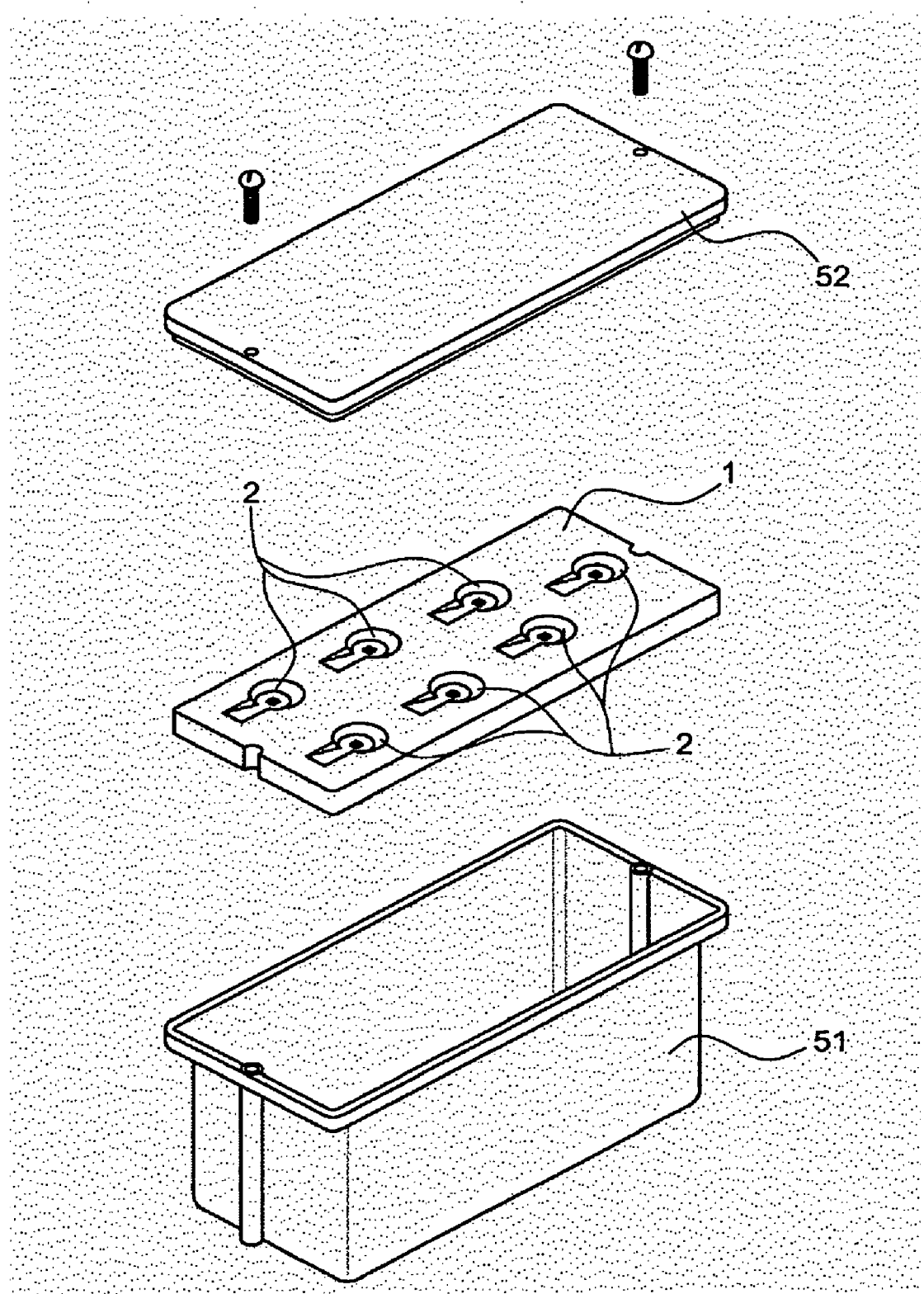
FIG. 5 shows one embodiment of the supporting element with associated light sources mounted thereon suitable for enclosure in a case with an at least partially transparent lens cover.

In another embodiment example the entire system is arranged inside said casing 51. Such case is possible with the embodiment example shown in FIG. 2, in which the light sources 2 are divided into two groups, assembled on a flexible printed circuit 1, win which the electronic components forming the control means 3 are also connected, and being possible to adapt the circuit to the taillight of a chosen vehicle, and therefore arrange it inside said casing 51. The two groups of light sources 2 can function in any of the previously explained modes for different embodiment examples, i.e. keeping one of the groups switched off while no light source 2 of active group fails, or keeping the two groups switched on and varying the intensity to be made to circulate through all the light sources 2 when a malfunctioning of any of the light sources 2 is detected. FIG. 5 illustrates a flexible printed circuit 1 mountable in a case 51 covered with an at least partially transparent lens cover 52.

Figure 4:
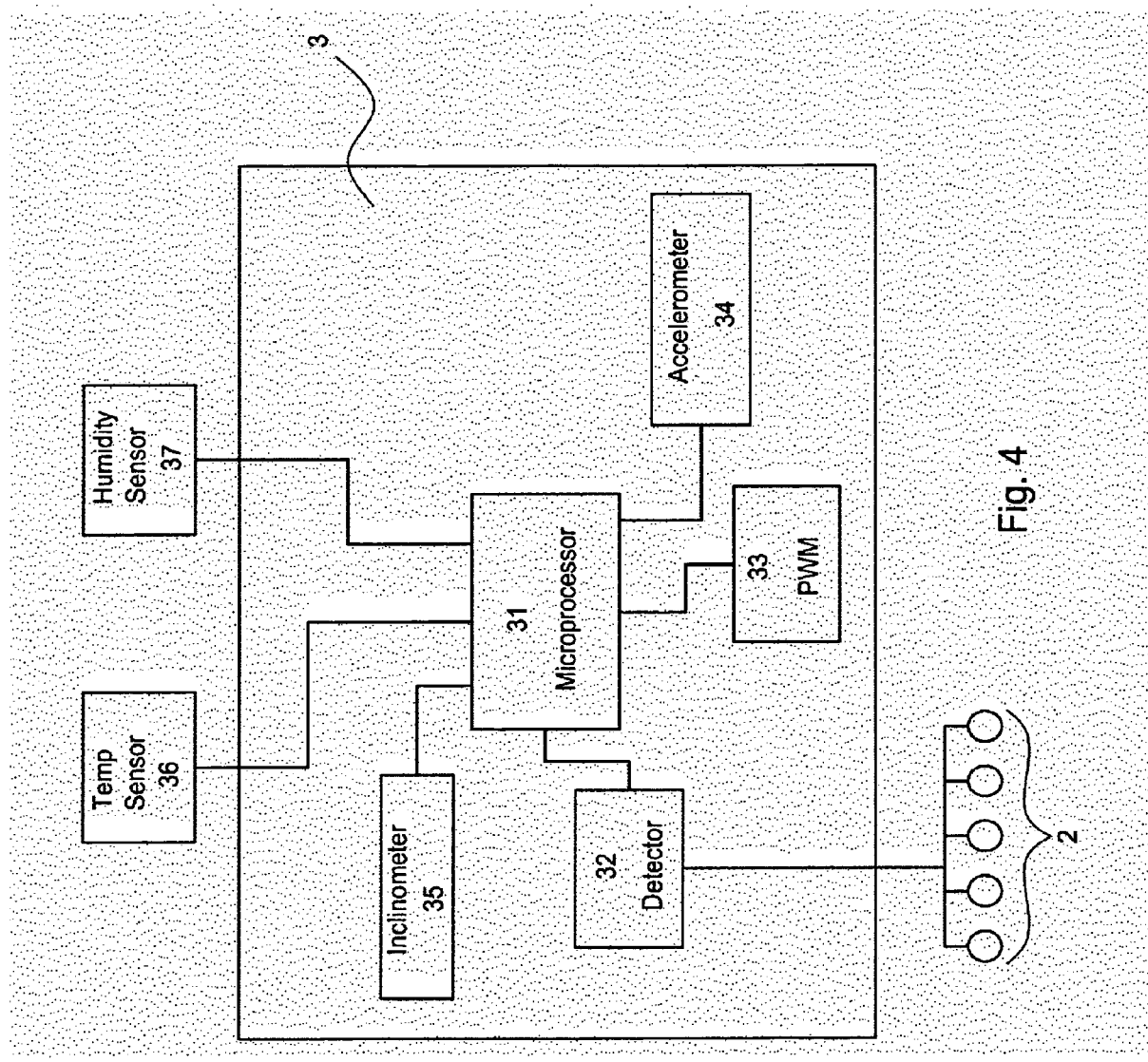
FIG. 4 shows a schematic diagram of one embodiment of the control means of the present invention.

FIG. 4 illustrates an embodiment of the control means 3 having in cooperative combination a microprocessor 31, a detector 32, a PWM technique means 33, an accelerometer 34, and aninclinometer 35 mounted thereon and cooperatively connected remotely are a temperature sensor 36 and a humidity sensor 37.

A person skilled in the art could introduce changes and modifications in the described embodiment examples without exceeding the scope of the invention as it is defined in the attached claims.

What is claimed is:

1. A rear lighting system adaptable to an automotive vehicle, of the type comprising:
    at least one supporting element (1),
    a plurality of light sources (2) assembled on said at least one supporting element (1), and
    a control means (3) electrically connected to said light sources (2) to actuate them such that the light sources (2) can emit at least two light intensity levels suitable to carry out at least two corresponding lighting functions, one of said lighting levels consisting of acting as brake lights, characterized in that said control means (3) comprises detection means for detecting a malfunctioning of at least one of said plurality of light sources (2), and said control means (3) is also adapted to compensate for a corresponding variation in the total light intensity provided by said rear lighting system due to said malfunctioning by actuating or deactivating at least another one of said plurality of light sources (2) and increasing or decreasing the current circulating through at least one functioning light source (2).

2. A rear lighting system according to claim 1, characterized in that said plurality of light sources (2) are divided into a first group, or main group, and a second group, or spare group, said second group being normally switched off and wherein at least a part of said second group being actuated by said control means (3) thereby compensating for the malfunctioning of any of said first group.

3. A rear lighting system according to claim 2, characterized in that said control means (3) is adapted to actuate at least one of said plurality of light sources (2) to emit with a light intensity level suitable for acting as anti-fog lights, upon detection of fog in the environment surrounding the vehicle.

4. A rear lighting system according to claim 3, characterized in that said control means (3) is adapted to detect using at least one fog sensor device.

5. A rear lighting system according to claim 4, characterized in that said control means (3) is adapted to detect fog using a fog sensor device comprises at least one humidity sensor and one temperature sensor.

6. A rear lighting system according to claim 1, characterized in that all of said plurality of light sources (2) are actuated simultaneously by said control means (3), and when at least one of said plurality of light sources (2) malfunctions, said control means (3) compensates for a corresponding variation in the total light intensity of said rear lighting system due to said malfunctioning by increasing or decreasing the current circulating though all of said plurality of light sources (2).

7. A rear lighting system according to claim 1, characterized in that another one of said lighting functions consists of acting as anti-fog lights.

8. A rear lighting system according to claim 7, characterized in that said plurality of light sources (2) emit with a third light intensity level to carry out a third lighting function consisting of acting as side lamps.

9. A rear lighting system according to claim 8, characterized in that said plurality of light sources (2) are LEDs.

10. A rear lighting system according to claim 9, characterized in that said supporting element (1) is a rigid printed circuit and said LEDs (2) are welded to electro conducting tracks on said rigid printed circuit.

11. A rear lighting system according to claim 9, characterized in that said control means (3) comprises an electronic system, comprising at least one microprocessor, associated to said detection means.

12. A rear lighting system according to claim 11, characterized in that it is adapted to be at least partially arranged inside a casing closed with a cover, at least partially transparent, said casing situated in the rear part of a vehicle.

13. A rear lighting system according to claim 12, characterized in that the entire system is adapted to be arranged in side said casing.

14. A rear lighting system according to claim 12, characterized in that a portion of the control means (3) is adapted to be arranged in another part of a vehicle different to that of said casing.

15. A rear lighting system according to claim 14, characterized in that said electronic system is adapted to be a part of a computer on board said vehicle.

16. A rear lighting system according to claim 9, characterized in that said supporting element (1) is a flexible printed circuit, and said LEDs (2) are welded to electro conducting tracks on said flexible printed circuit.

17. A rear lighting system according to claim 1, characterized in that said electronic system of said control means (3) controls said current circulating through said at least one other light source.

18. A rear lighting system according to claims 1 or 6, characterized in that said control means (3) is adapted to be suitable to carry out said current circulation though said at least said other light source (2) by Pulse Wave Modulation (PWM) techniques.

19. A rear lighting system according to claim 1, characterized in that said control means (3) is adapted to actuate at least one of said plurality of light sources (2) to emit a light intensity level suitable for acting as brake lights, corresponding to the detection of a sudden speed reduction of a vehicle not caused by actuating a brake pedal thereof.

20. A rear lighting system according to claim 19, adapted to detecting said sudden speed reduction of said vehicle by means of an accelerometer.

21. A rear lighting system according to claim 19, adapted to detecting said sudden speed reduction of said vehicle by means of an inclinometer detecting a corresponding inclination of the vehicle caused by the sudden speed reduction.

22. A rear lighting system according to claim 19, characterized in that said control means (3) is adapted to detecting said sudden speed reduction of said vehicle by means of communication with a computer on board said vehicle.

* * * * *